US008966105B2

(12) United States Patent
Blom et al.

(10) Patent No.: US 8,966,105 B2
(45) Date of Patent: Feb. 24, 2015

(54) SENDING SECURE MEDIA STREAMS

(75) Inventors: Rolf Blom, Järfälla (SE); Yi Cheng, Sundyberg (SE); John Mattsson, Garmgränd (SE); Mats Näslund, Bromma (SE); Karl Norrman, Stockholm (SE)

(73) Assignee: Telefonaktiebolget L M Ericsson (publ), Stockholm (SE)

( * ) Notice: Subject to any disclaimer, the term of this patent is extended or adjusted under 35 U.S.C. 154(b) by 340 days.

(21) Appl. No.: 12/999,178

(22) PCT Filed: Feb. 20, 2009

(86) PCT No.: PCT/EP2009/052078
§ 371 (c)(1),
(2), (4) Date: Dec. 15, 2010

(87) PCT Pub. No.: WO2009/153072
PCT Pub. Date: Dec. 23, 2009

(65) Prior Publication Data
US 2011/0093609 A1      Apr. 21, 2011

Related U.S. Application Data

(60) Provisional application No. 61/061,854, filed on Jun. 16, 2008.

(51) Int. Cl.
G06F 15/16      (2006.01)
H04L 29/06      (2006.01)
(52) U.S. Cl.
CPC .......... H04L 65/605 (2013.01); H04L 63/0428 (2013.01); H04L 65/608 (2013.01)
USPC ............ 709/231; 709/246; 709/247; 709/248
(58) Field of Classification Search
USPC .......................................... 709/231, 246–248
See application file for complete search history.

(56) References Cited

U.S. PATENT DOCUMENTS

| | | | |
|---|---|---|---|
| 7,496,682 B2 * | 2/2009 | Layman et al. | 709/238 |
| 7,912,217 B2 * | 3/2011 | Baugher et al. | 380/200 |
| 2002/0038385 A1 * | 3/2002 | Kalliokulju | 709/247 |
| 2003/0169783 A1 * | 9/2003 | Coffin et al. | 370/536 |
| 2005/0163316 A1 * | 7/2005 | Wing | 380/257 |
| 2007/0294186 A1 * | 12/2007 | Yan | 705/71 |
| 2008/0141331 A1 * | 6/2008 | Tasker et al. | 726/1 |
| 2008/0235722 A1 * | 9/2008 | Baugher et al. | 725/32 |
| 2009/0103737 A1 * | 4/2009 | Kim et al. | 381/17 |
| 2009/0164655 A1 * | 6/2009 | Pettersson et al. | 709/231 |
| 2010/0142413 A1 * | 6/2010 | Eriksson et al. | 370/261 |

FOREIGN PATENT DOCUMENTS

WO   WO 0131881 A1 *   5/2001

OTHER PUBLICATIONS

Audio-Video Transport Working Group H Schulzrinne GMD Fokus S Casner Precept Software et al: "RTP: A Transport Protocol for Real-Time Applications; rfc1899.txt" IETF Standard, Internet Engineering Task Force, IETF, Ch, Jan. 1, 1996, pp. 1-76.

(Continued)

Primary Examiner — Oanh Duong
(74) Attorney, Agent, or Firm — Myers Bigel Sibley & Sajovec, P.A.

(57) ABSTRACT

A method and apparatus for sending a first secured media stream having a payload via an intermediate node. The intermediate node receives from a sender the first secured media stream. An end-to-end context identifier and a hop-by-hop context identifier are determined for the first secured media stream, where the hop-by-hop context identifier relates to the intermediate node and the end-to-end identifier relates to the sender. A second secured media stream is generated, which includes at least the payload of the first secured media stream and the context identifiers to identify the first secured media stream. The second secured media stream is sent to a receiving node, and the context identifiers are also sent to the receiving node. The context identifiers are usable by the receiving node to recover the first secured media stream.

17 Claims, 7 Drawing Sheets

(56) References Cited

OTHER PUBLICATIONS

Ono Columbia University S Tachimoto NNT Corporation K: "End-to-middle Security in the Session Initiation Protocol (SIP); draft-ietf-sip-e2m-sec.06.txt" IETF Standard-Working-Draft, Internet Engineering Task Force, IETF, CH, vol. sip, No. 6, Jul. 7, 2007, 30 pages.
Cisco: "Securing Internet Telephony Media with SRTP and SDP" Internet Publication, [Online] Feb. 23, 2007 pp. 1-11.
Weirong Jiang: "A Lightweight SIP Model for End-to-End Communication" Internet Publication, [Online], Jan. 21, 2006, pp. 1-8.
Written Opinion of the International Searching Authority for PCT/EP2009/052078.
European Office Action Corresponding to European Application No. 09 765 652.4; Dated: Aug. 21, 2013; 7 Pages.
Wing D., Cisco Systems, "Datagram TLS Secure RTP (DTLS-SRTP) Key Transport draft-wing-avt-dtls-srtp-key-transport-01", Feb. 15, 2008, 19 Pages.

* cited by examiner

SENDING SECURE MEDIA STREAMS

CROSS REFERENCE TO RELATED APPLICATION

This application is a 35 U.S.C. §371 national stage application of PCT International Application No. PCT/EP2009/052078, filed on 20 Feb. 2009, which claims priority from U.S. Provisional Application No 61/061,854 filed Jun. 16, 2008, the disclosures and contents of which are incorporated by reference herein in their entireties. The above-referenced PCT International Application was published in the English language as International Publication No. WO 2009/153072 A1 on 23 Dec. 2009.

TECHNICAL FIELD

The invention relates to the field of sending secure media streams.

BACKGROUND

The Real-time Transport Protocol (RTP) is a protocol for delivering audio and video media data over a packet switched network. RTP is used for transporting real-time and streaming media data, such as interactive audio and video. It is therefore used in applications such is IPTV, conferencing, Voice over IP (VoIP).

The Secure Real-time Transport Protocol (SRTP), specified in IETF RFC 3711 from March 2004, is a transport security protocol specified as a profile of RTP, which provides a form of encrypted RTP. In addition to encryption, it can provide message integrity, and replay protection, in unicast, multicast and broadcast applications. SRTP is used to protect content delivered between peers in an RTP session. SRTP is only intended to protect data during transport between two peers running SRTP. In particular, it does not protect data once it has been delivered to the endpoint of the SRTP session. In addition, the sending peer provides the protection by way of encryption of the media data, in other words it is assumed that the sending peer has knowledge of all keying material and is the one applying the protection of the data.

RTP is closely related to RTCP (RTP control protocol), which can be used to control the RTP session, and similarly SRTP has a sister protocol, called Secure RTCP (or SRTCP), also specified in RFC 3711. SRTCP provides the same security-related features to RTCP as the ones provided by SRTP to RTP.

Utilization of SRTP or SRTCP is optional to utilization of RTP or RTCP; but even if SRTP/SRTCP are used, all provided features (such as encryption and authentication) are optional and can be separately enabled or disabled. The only exception is the message authentication/integrity feature, which is indispensably required when using SRTCP. Confidentiality protection in SRTP and SRTCP covers the payload, while integrity protection covers the payload and the full packet header.

Many content delivery systems and communication services are based on store and forward mechanisms and require end-to-end confidentiality and integrity protection of media. In this scenario, media first traverses a first hop between a sender and an intermediate storage entity, and then (almost immediately or after some time) a second hop from the storage entity to a second entity. The second entity may be the intended receiver or yet another intermediate storage entity. Ultimately, however, the media is delivered to the intended receiver. However, each hop at an intermediate node (such as a Store and Forward Server) should be integrity protected. (The term "hop" is used herein to denote a logical link between two logically adjacent nodes in a network.) This is needed to allow an intermediate node to check the authenticity of media data packets arriving, for example where a mailbox or network answering machine stores media. This is necessary to protect against an attacker filling up the storage on the device with garbage. However, the keys necessary to decrypt the media or calculate/modify end-to-end (e2e) integrity protection should not be available to the intermediate node, to prevent the intermediate node from manipulating or having access to the plaintext media data.

A further issue is that an intermediate node (e.g. a voice mailbox) may handle messages, all directed to a specific recipient, but originating from several senders, and may therefore need to resend several stored and independently e2e protected streams together with media that is hop-by-hop protected. Additional problems may arise if the intermediate node locally generates media to be interleaved with the stored and protected streams. For instance, a voice mailbox may add its own voice-instructions to the end-user, e.g. "Press 4 to delete message". This locally generated data should in general also be protected between server and end-user.

SRTP IETF RFC 3711 protects RTP and RTCP using cryptographic parameters stored in so-called cryptographic contexts. SRTP specifies that the cryptographic context of a media stream must be uniquely identified by a triplet context identifier:

Context id=<SSRC, destination network address, destination transport port number>, where SSRC is the RTP Synchronization Source.

For a given packet, it must be possible for the receiver to identify the context with which the packet should be processed. For this reason, part of the context identifier, namely the SSRC, is carried in-band in the RTP application, whereas the other parts, IP address and port, are "implicit" and provided by lower layers. The following description omits the implicit parts from the discussion in order to improve the clarity.

Media streams can be associated with such a context, said context containing keys and other security related data. The context may be determined using the Synchronization source (SSRC) used by a media data source node in e2e encryption direct to the receiver node (termed SSRC_e2e). A problem arises when media streams are sent via an intermediate node. Firstly, when sending data via an intermediate node that should not have access to the encrypted media, two types of keys are required; an e2e key and a hop-by-hop key, where the hop-by-hop key is used by each intermediate node to verify the integrity of the media data coming from the previous-hop node. However, this key should not be usable to decrypt the media data. When the intermediate node resends media data to a receiver, it may choose a new random SSRC and context identification fails. The SSRC used between the intermediate node and the receiver is then very likely to differ from the SSRC used by the original sender. Since the SSRC is used to identify the cryptographic context at the receiver, it is unlikely that the receiver could retrieve the correct context.

The above problems become even more obvious and complex when there are multiple media streams by one or more senders that, when forwarded to the destination, should be multiplexed into a single protected stream by an intermediate node. Even if the intermediate node is configured to use the original SSRC of each sender, choosing the context based on the SSRC_e2e may still lead to collisions, as they are chosen independently and randomly by the original senders who do not have to be synchronized in any way. Even with only a few SSRCs, the probability of collision is not negligible and reliable context identification will not be achieved.

SUMMARY

It is an object of the invention to overcome or at least reduce the limitations of sending secure media streams from a sending node to a receiving node via an intermediate node, and to ensure that the intermediate node does not have access to the secure media.

According to a first aspect of the invention, there is provided a method of sending a first secured media stream having a payload via an intermediate node. The intermediate node receives from a sender the first secured media stream. An end-to-end context identifier and a hop-by-hop context identifier are determined for the first secured media stream, where the hop-by-hop context identifier relates to the intermediate node and the end-to-end identifier relates to the sender. A second secured media stream is generated, which includes at least the payload of the first secured media stream and the context identifiers to identify the first secured media stream. The second secured media stream is sent to a receiving node, and the context identifiers are also sent to the receiving node. The context identifiers are usable by the receiving node to recover the first secured media stream. The use of end-to-end and hop-by-hop context identifiers allows the receiving node to recover the first secured media stream, whilst the intermediate node is unable to recover the first secured media stream.

As an option, the intermediate node receives from a sender at least one further secured media stream. In this case, a further end-to-end context identifier and a further hop-by-hop context identifier are determined for the further secured media stream. The further hop-by-hop context identifier relates to the intermediate node and the further end-to-end identifier relates to the sender. The payloads of the first secured media stream and the further secured media stream are multiplexed using the context identifiers to identify those portions of the secured multiplexed media stream relating to the first and further secured media stream respectively. The secured multiplexed media stream is sent to the receiving node, and the further end-to-end context identifiers and further hop-by-hop context identifiers are also send to the receiving node. The context identifiers are by the receiving node to demultiplex the secured multiplexed media stream. This allows the receiving node to retrieve individual media streams from the secured multiplexed media stream.

Optionally, the end-to-end context identifier comprises an identifier relating to the sender. As an alternative option, the end-to-end context identifier is derived from a synchronization source used by the sender, and the hop-by-hop context identifier is derived from a synchronization source used by the intermediate node.

At least one of the context identifiers is optionally sent in one of a Real-time Transport Protocol synchronization source, a Real-time Transport Protocol header extension and a Contributing Source identifier in a Real-time Transport Protocol header. As an alternative option, at least one of the context identifiers is sent in one of a Real-time Transport Control Protocol Application packet and a PRIV filed in a Secure Real-time Transport Protocol stream. In yet a further option, at least one of the context identifiers is signalled to the receiving node in an SRTP Master Key Identifier tag. In still a further option, the end-to-end context identifier is sent in a designated field of a packet.

As an option, the receiving node receives the context identifiers, receives the secured media stream, and uses the context identifiers to recover the secured media stream. Where a multiplexed media stream is sent, the method optionally comprises the receiving node receiving the context identifiers and the further context identifiers, receiving the secured multiplexed media stream, and using the context identifiers and further context identifiers to demultiplex the secured multiplexed media stream.

According to a second aspect of the invention, there is provided an intermediate node for use in a communication network. The intermediate node is provided with a receiver for receiving from a sender a first secured media stream. A first context determining function is arranged to determine for the first secured media stream an end-to-end context identifier and a hop-by-hop context identifier, the hop-by-hop context identifier relating to the intermediate node and the end-to-end to end identifier relating to the sender. A processing function is provided for generating a second secured media stream, the second secured media stream including at least the payload of the first secured media stream and the context identifiers to identify the secured media stream. A first transmitting function is arranged to for transmit the second secured media stream to a receiving node, and a second transmitting function is arranged to transmit the context identifiers to the receiving node, the context identifiers being usable by the receiving node to recover the secured media stream.

As an option, the intermediate node is provided with a further receiving function for receiving at least one further secured media stream. A further determining function is provided for determining for the further secured media stream a further end-to-end context identifier and a further hop-by-hop context identifier. The further hop-by-hop context identifier relates to the intermediate node and the further end-to-end context identifier relates to the sender. A multiplexing function is provided for multiplexing the payloads of the first secured media stream and the further secured media stream using the context identifiers to identify those portions of the secured multiplexed media stream relating to each secured media stream. The first transmitting function is arranged to send the secured multiplexed media stream to the receiving node, and the second transmitting function is arranged to send the end-to-end context identifiers and the hop-by-hop context identifiers to the receiving node, the context identifiers being usable by the receiving node to demultiplex the secured multiplexed media stream.

It is a further object of the invention to allow the receiving node to access the secure media where it is received in a multiplexed media stream.

According to a third aspect of the invention, there is provided a receiving node for receiving a multiplexed secured media stream derived from a plurality of secured media streams. A first receiver is provided for receiving an end-to-end context identifier and a hop-by-hop context identifier, the end-to-end context identifier relating to a sender, the hop-by-hop context identifier relating to an intermediate node between a media data source and the receiver node. The context identifiers are used for multiplexing the plurality of secured media streams to identify those portions of the secured multiplexed media stream relating to each media stream. A second receiver is provided for receiving the secured multiplexed media stream, and a processor is provided for using the context identifiers to demultiplex the secured multiplexed media stream.

According to a fourth aspect of the invention, there is provided a computer program comprising computer readable code means which, when run on an intermediate node, causes the intermediate node to perform the method described above as the first aspect of the invention.

According to a fifth aspect of the invention, there is provided a computer program product comprising a computer readable medium and a computer program as described in the fourth aspect of the invention. The computer program is stored on the computer readable medium.

DETAILED DESCRIPTION

An intermediate node resends/forwards to a receiver at least one e2e encrypted stream from one or more senders together with hop-by-hop encrypted media that the intermediate node has access to. New identifiers and mappings are introduced that uniquely identify the contexts of the media stream (e2e context and hop-by-hop context). The receiver can use the identifiers and mappings to recover the media content, and in the case of a multiplexed media stream, the receiver can correctly switch between different e2e protection contexts and one or more hop-by-hop contexts.

Examples of where an intermediate node may need to send several protected media streams multiplexed into a single session include Store and forward mailboxes or answering machines, caching of IPTV content for more efficient, local access to content, and mixing/switching of several protected media streams in IPTV applications or in VoIP conferences.

The following terms are used throughout the following description.

The term "protected (RTP) media (stream)" refers to a stream/sequence of (RTP) payloads that have been encrypted and/or integrity protected.

The term "SRTP session" refers to an RTP/RTCP session protected according to RFC3711, or a variant of RFC3711 such as a future extension of RFC3711).

The term "hop-by-hop context" refers to a (standard) SRTP context. Hop-by-hop is used only to highlight that it is a context shared between an intermediate node and some other node (another intermediate node or a sending or receiving node) when sending or receiving protected media.

The term "e2e context" refers to cryptographic data (keys etc) used to create/process "protected RTP media" (as defined above) at a sending or receiving node. E2e contexts are thus always shared between a sender and a receiver.

The term "SRTP multiplexed context" refers to a combination of one hop-by-hop context and one or more e2e contexts.

Note that while SRTP also creates protected media, the term "protected RTP media" defined above is not necessarily created using SRTP (or an extension thereof). The motivation for using separate terms follows from the trust model discussed above: the intermediate node is not trusted to access the unprotected media data, and so the protection mechanism(s) used to produce the protected media should not be a concern of an intermediate node and should therefore be transparent to it. Moreover, it is desirable that the intermediate node is as far as possible compliant with the existing SRTP spec (RFC3711) without being aware of the extensions to SRTP which might be implied on the sender/receiver side when using the present invention.

Figure 1:
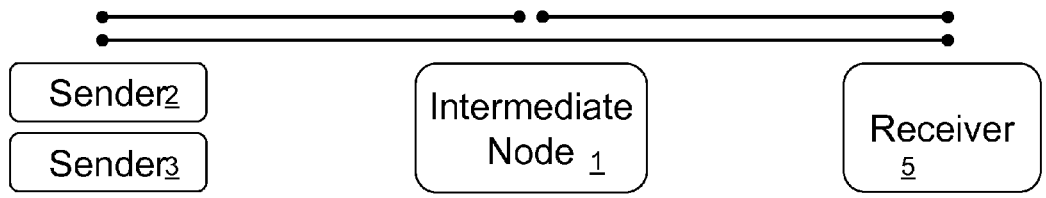
FIG. 1 illustrates schematically in a block diagram a trust model according to an embodiment of the invention.

FIG. 1 illustrates a trust model according to an embodiment of the invention. It is required for an intermediate node to be able to resend protected RTP media received as part of a plurality of SRTP sessions using a second SRTP session that is independent of the SRTP session(s) that were used when the intermediate node received the protected media from the sender(s) (i.e. using new SRTP session parameters when forwarding the protected media to a receiver), and without having to decrypt and re-encrypt the media, in particular without requiring the intermediate node to have access to the plaintext data. The protected media may have been sent by one or more senders at different points in time and using different cryptographic transforms, keys, and key management protocols. Within the same SRTP session between the intermediate node and the receiver node, protected media originating from the intermediate node (or a node associated with the intermediate node) being forwarded instantly may be mixed with deferred protected media stored by the intermediate node. For example, the intermediate node may be an "answering machine" having recorded protected media from several callers using separate SRTP sessions, and "listening" to the stored messages takes place at the receiver over a new independent single SRTP session.

As indicated above, the intermediate node might also, within the same SRTP session, send or interleave additional media that it creates in real-time or media that is locally stored in plaintext. For example, the answering machine described above may add its own spoken messages to implement a "user interface" towards the receiver/end-user. Another example is for an intermediate node to add a media advertisement targeted to the receiver/end user.

Figure 2:
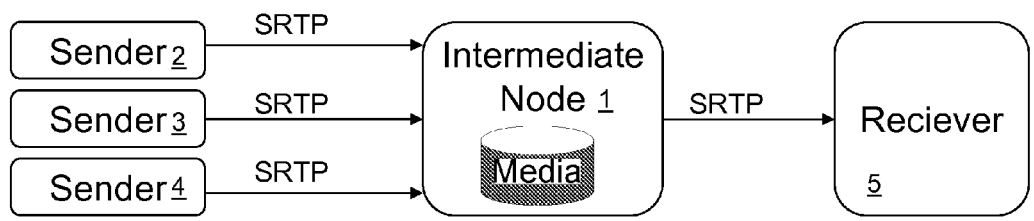
FIG. 2 illustrates schematically in a block diagram network architecture according to an embodiment of the invention.

As described above, in the simplest situation there is only one sender engaging in one SRTP session with the intermediate node, containing protected RTP media for a given receiver. However, in order not to lose generality, the following description discusses the more general case where there are a plurality of senders and associated security contexts. The situations described are illustrated in FIG. 2, in which an intermediate node 1 receives a plurality of SRTP sessions from a plurality of protected media source nodes 2, 3, 4, and subsequently sends the received protected media in a single SRTP session to a receiver node 5.

The protected media from some or all of the senders 2, 3, 4 is typically e2e confidentiality protected and may also be e2e integrity protected. The parameters (keys etc) used are associated with an e2e context, shared between each sender and ultimate receiver. The e2e protected media might also be further integrity protected hop-by-hop (using SRTP) between the senders and the intermediate node 1, and so the used security parameters are associated with a hop-by-hob (hbh) context. Note that the protected media may traverse several intermediate nodes, and integrity protection may be required for each hop. The intermediate node 1 checks the integrity of the incoming SRTP session and generates a new outgoing hop-by-hop integrity protection using SRTP if needed.

The sender, the receiver, and the intermediate nodes need to identify the correct contexts, as discussed below.

Figure 3:
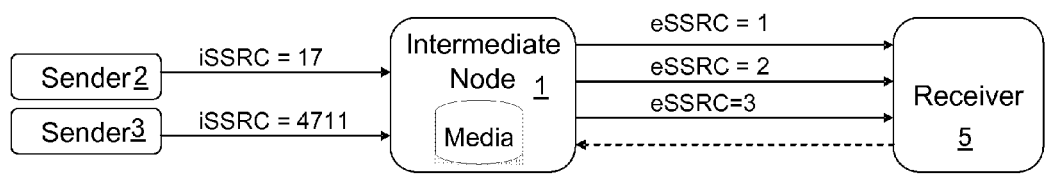
FIG. 3 illustrates schematically in a block diagram network architecture according to a further embodiment of the invention in which several protected media streams are sent using individual SRTP sessions.

FIG. 3 illustrates a scenario in which several protected media streams are sent using individual SRTP sessions to the intermediate node 1 for storage, and subsequently resent as a single SRTP session to the receiver 5. Each original SRTP session is associated with an iSSRC (ingress Synchronization Source) by the senders and intermediate node 1. iSSRC is used by the intermediate and each sender to identify the corresponding hop-by-hop context for each stream according to SRTP. Specifically, for the jth sender:

$$\text{Hop-by-hop context id}\_j = <iSSRC\_j> \qquad \text{(Math 1)}$$

As noted above, for clarity the port and IP address have been omitted from the context identifier. The intermediate node 1 stores these iSSRC_j values in association with the corresponding e2e protected media streams. Next (possibly at a much later time), the stored different e2e protected media streams are resent by the intermediate node 1, to the receiver 5. The intermediate node 1 can now choose SSRC value(s) for the corresponding SRTP session towards the receiver 5 subject to a condition that the chosen SSRC values are distinct. Note that RTP requires that SSRCs used within the same RTP session are unique and that an anti-collision mechanism is built into RTP. In order to guarantee unique identification of the contexts by the receiver 5, the intermediate node 1 creates a mapping of the iSSRC_j originally used by the senders to eSSRC_j (egress) values used within the resending SRTP session, e.g.:

$$eSSRC\_j = F(iSSRC\_j, ID\_j \ldots) \qquad \text{(Math 2)}$$

where F is a mapping that guarantees that each eSSRC_j is unique, even if two iSSRC_j used by two senders are originally the same, e.g. by including dependency on the sender identity, ID_j. In other cases, it may be practical to let eSSRC_j depend at least partially on a content identifier. For example, where the content is a movie or song, information identifying the song/movie could be included. Alternatively, function F selects random eSSRC_j values under a restriction that no two eSSRC j values are identical. The intermediate node 1 communicates to the receiver (or to the next intermediate node, if there are more than one) how it has performed the mapping, e.g. by transferring tuples of form (iSSRC_j, ID_j, eSSRC_j), or (iSSRC_j, ID_j) and a description of the mapping F used. The SRTP session between the intermediate node 1 and the receiver 5 now identify SRTP contexts using:

$$\text{Hbh context}\_j = e2e\_context\_j = <eSSRC\_j> \qquad \text{(Math 3)}$$

Figure 4:
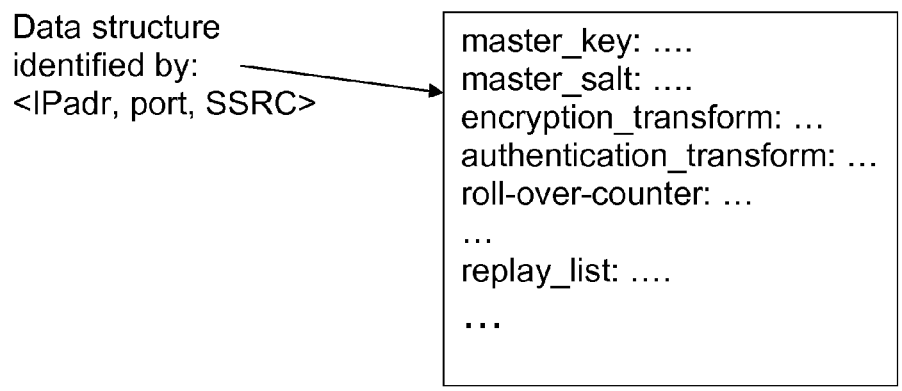
FIG. 4 illustrates schematically a standard SRTP context.
Figure 5:
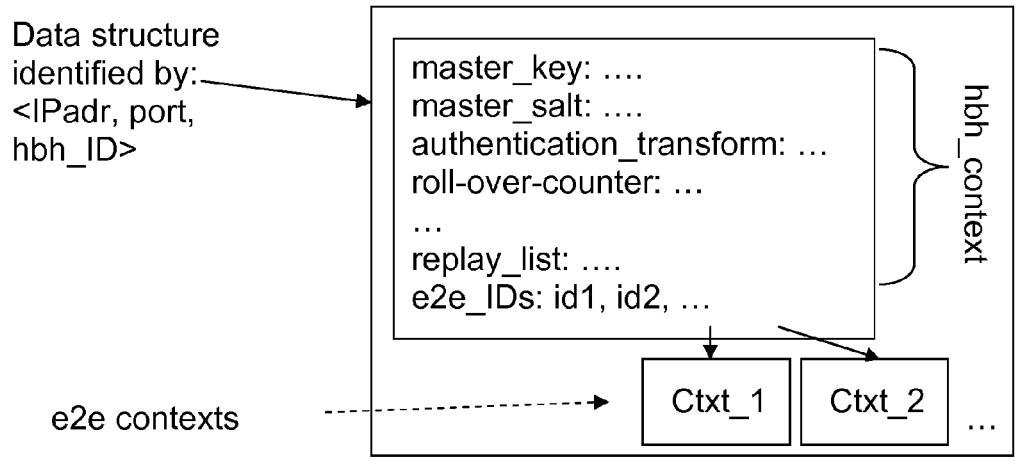
FIG. 5 illustrates schematically a SRTP context according to an embodiment of the invention.

The intermediate node 1 may use standard SRTP contexts. Referring to FIG. 4, a standard SRTP context would, as discussed, have a data structure identified by <IPadr, port, SSRC> (where SSRC=eSSRC_j), and includes data describing a master key, a master salt, an encryption transform, an authentication transform and a replay list. At the receiver side however, "extended" multiplexed SRTP contexts are used to allow both e2e and hbh protection. As shown in FIG. 5, the data structure of the SRTP context is identified, in one embodiment, by <IPadr, port, hbh_context_ID>. Specifically, the receiver 5 splits each context into two parts: the hbh part, common for all multiplexed protected media streams within the SRTP session, and includes a master salt, an encryption transform, an authentication transform, a replay list and a list of e2e contexts. An e2e context part is included for each multiplexed protected media stream. The e2e contexts include the same data as a conventional SRTP context described above. In other words, the receiver 5 populates the hbh part using SRTP parameters negotiated between the intermediary and the receiver, whereas the e2e contexts are populated by parameters carried e2e between each sender and the receiver, e.g. out-of-band.

Where a stream is used to send media that is not e2e protected, then a set of identifiers either identify an e2e context with null algorithms, or do not identify an e2e context at all.

When retransmitting protected media, the intermediate sets the SSRC value in the RTP packet according to the mapping above, and applies SRTP protection according to its hbh context. The receiver uses the included SSRCs to retrieve the hbh context and the e2e context.

Protected media is therefore typically sent multiplexed in a single SRTP session, but note that it is possible to send media from several streams at once, which can then be combined at the receiver. That is, each original SRTP session of protected media is re-sent within a new SRTP session.

Figure 6:
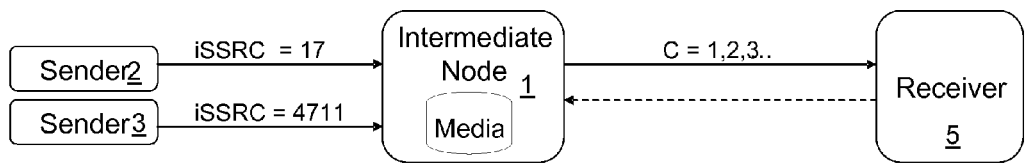
FIG. 6 illustrates schematically in a block diagram signalling where a plurality of received media streams are multiplexed into a single SRTP media stream.

FIG. 6 illustrates, in another embodiment, the case where two stored protected media streams are multiplexed at the intermediate node 1 and sent to the receiver node 5 as a single SRTP session. The current e2e context associated with the protected media, re-sent from the intermediate node 1, is identified by a new Context Identifier C. The Context Identifier C can be signalled between the intermediate node 1 and the receiver 5 in the RTP/RTCP stream or "out-of-band", e.g. using SIP or other control protocols where it is assumed that the intermediate node 1 has stored information about the original senders (e.g. their identities) and can inform the receiver 5 how the C values have been assigned. The identifier C (e.g. a 32-bit number) could contain explicit information on the identity of the original sender and/or the original context identifier, but may in general be chosen entirely at the discretion of the intermediate node 1, with the only requirement that it is unique for each associated original sender 2, 3 of the associated protected media/e2e context. In particular, the value C may have no explicit dependency of any of the original iSSRC used by the senders 2, 3, nor their identities (except the imposed condition that distinct senders are associated with distinct C values). In any case, each e2e context is now uniquely identified at the receiver by the Context Identifier C:

$$\text{E2e context id} = <C> \qquad \text{(Math 4)}$$

The hbh context can be identified at the receiver 5 using standard SRTP SSRC mechanisms as discussed above. This implies using a single hbh context and a plurality of e2e contexts. Alternatively, the hbh context can also be identified using C. Since the hbh part of the contexts remains fixed, regardless of which e2e context is currently being used, it may be "wasteful" of storage to repeat the hbh parts for each e2e part and the aforementioned multiplexed SRTP context with a hbh part and an e2e part could be used.

The intermediate node 1 may use the same identifier(s) for its hbh SRTP context.

In the example of FIG. 6, the first sender 2 sends a media stream having iSSRC_2=17, and the second sender 3 sends a media stream having iSSRC_3=4711. The intermediate node stores the corresponding protected media streams and subsequently multiplexes them into a single SRTP session. The first protected media stream is allocated a Context Identifier of, for example, C=1, and the second stream is allocated a (distinct) Context Identifier of, for example, C=2, and so the receiving node 5 can determine to which context each stream the data belongs to. As described above, in some situations it may be practical to let C depend at least partially on a sender identity and/or a content identifier.

For media that is not e2e protected, e.g. media generated locally by the intermediate node, a special reserved C-value may be used, e.g. C=0.

Figure 7:
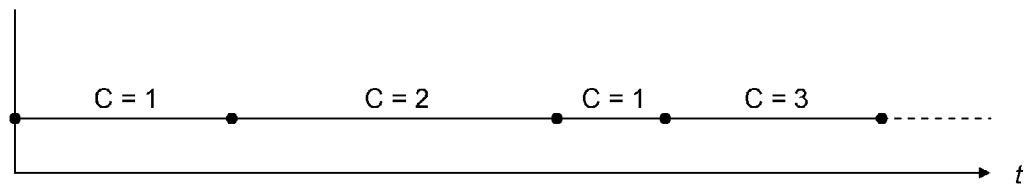
FIG. 7 illustrates schematically how a context in a single multiplexed media stream changes with time.

FIG. 7 illustrates how the Context Identifier C changes with time. In this example, three protected media streams received over distinct SRTP sessions at the intermediate node 1 have been multiplexed into a single SRTP session towards the receiver 5. The Context Identifier C changes depending on which source the data in the multiplexed media stream arises from. The Context Identifier C can be changed per packet to allow resending of several streams simultaneously. Transfer of the C values between intermediate and receiver is discussed below.

In a further embodiment, C-values are included in-band already in the original message sent from the sender. The intermediate node may, as discussed above, use re-mapping of C-values when forwarding messages to the receiver and the also informs the receiver how the mapping has been done, e.g. by specifying pairs of form (ingress-C, egress-C). This embodiment is essentially equivalent to that illustrated in FIG. 3, the only difference being that an additional, designated information field is used rather than the SSRC field which already exists in the RTP headers.

The Context Identifier C can also be used to identify more than just the security context, for example audio/video Codecs and codec parameters.

Figure 8:
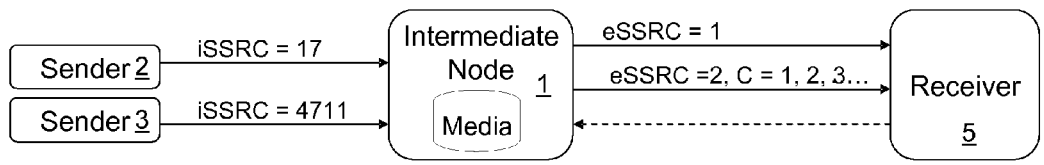
FIG. 8 is a signalling diagram showing an example signalling according to an embodiment of the invention.

In another embodiment shown in the example of FIG. 8, which can be considered as a combination of the two previous embodiments, some contexts can be identified using eSSRC, and others may be identified by the Context Identifier C field in an expanded Master Key Identifier (MKI), and yet others by a combination of eSSRC and Context Identifier C. Both contexts are uniquely identified by the pair eSSRC, C:

$$\text{Hop-by-hop context } id=<eSSRC, C> \quad \text{(Math 5)}$$

$$\text{E2e context } id=<eSSRC, C> \quad \text{(Math 6)}$$

A example scenario is when the receiver 5 sets up several SRTP sessions with the intermediate node 1 but only some sessions consist of multiplexed protected media from more than one sender.

As with the first two embodiments, C values are signalled in-band between the intermediate node 1 and the receiver 5. One option is to signal context switch (i.e. change of C-value) using SRTP MKI field, for example using a (modified) SRTP MKI field. The MKI is a variable-length field in SRTP packets which was originally intended to indicate only which key to use, allowing for the use of multiple master keys in the SRTP context and switching between these midstream. However, for the present invention, the MKI can be used to signal more general forms of context switch. Specifically, packets associated with context C would use MKI=C and so on.

An "extended" MKI tag can also include both a MKI (chosen as a "standard" SRTP MKI by the intermediate) as well as an e2e part of the context identifier, C. The MKI tag sent from the intermediate node 1 to the receiver 5 can then be, for example, Expanded MKI=MKI||C.

Figure 9:
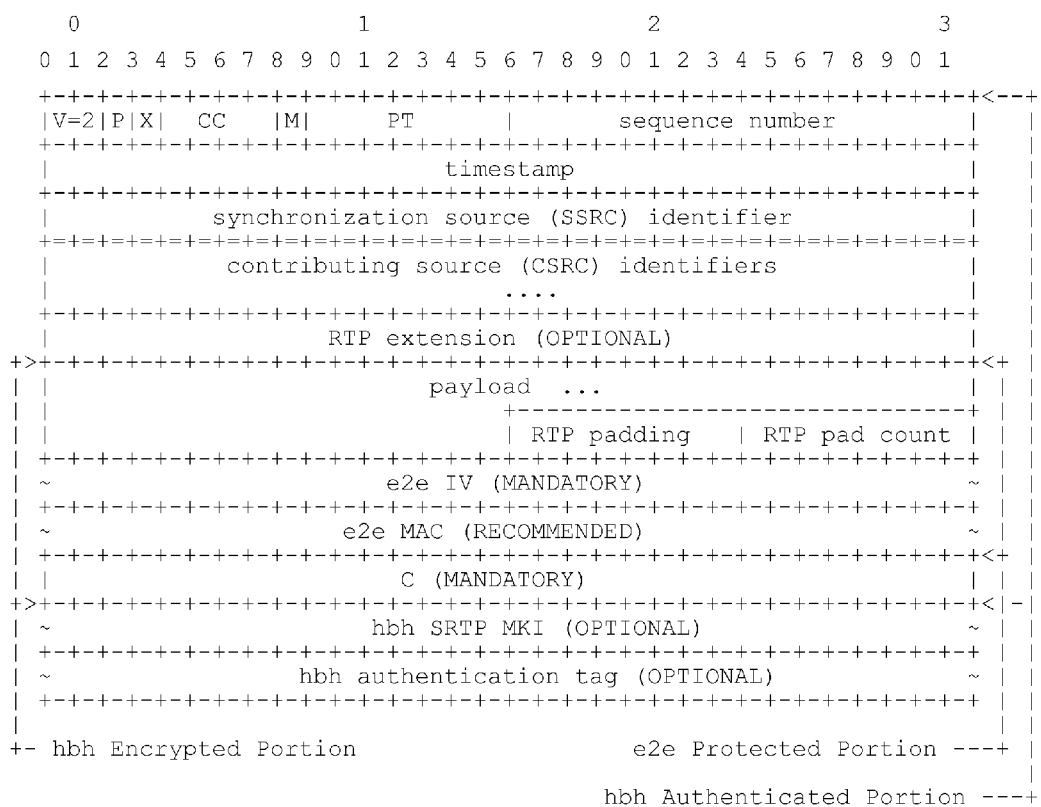
FIG. 9 illustrates an RTP packet format according to an embodiment of the invention.

Yet another approach is to structure the RTP packet into an e2e part and a hbh part as shown in FIG. 9. The C field is here carried after the e2e protected part (as it must be possible to insert by the intermediate node) and the C field may thus be protected by the hbh part.

Alternatively, the Context Identifier C can be sent in an RTP header extension. Context Identifier C may either be sent in every packet or just in some packets, together with an SRTP index indicating the first SRTP packet for which the specified context identified by Context Identifier C will be used (the SRTP index is constructed from the RTP sequence number and a roll-over counter kept at the sender and receiver, which is conceptually increased by one each time the RTP sequence number wraps around). The header extension might also include other information such as codec information. The header extension must be constructed so that the receiver can identify the header extension as carrying a context identifier. Furthermore, in this embodiment the receiver 5 must (logically) remove the header extension before the authentication tag associated with the e2e context is checked, since the e2e authentication tag was originally applied without the presence of the extension.

In a further specific embodiment, the Context Identifier C can be sent in a Contributing Source (CSRC) field of a RTP header. Context Identifier C might either be sent in every packet or just in some packets, together with an RTP sequence number indicating the first RTP packet for which the specified context identified by Context Identifier C will be used. The header might also include other information such as codec information. The CSRC field must be constructed so that the receiver can identify the header extension as carrying a context identifier. The receiver 5 must also here remove the CSRC field before the e2e authentication tag is checked.

In a further specific embodiment, the Context Identifier C can be sent in an RTCP Packet, for example the generic "application data" type of packet (RTCP APP), or a PRIV field (used for private data) in the SRTP SDES packet type (see IETF RFC 3550). Since this is more of an out-of-band signalling mechanism, the context identifier Context Identifier C is preferably sent together with an SRTP index indicating the first RTP packet for which the context identified by Context Identifier C will be used. The RTCP packet may also include other information such as codec information.

Key management for the intermediate node-receiver link is out of the scope of the present invention. Since media streams from multiple e2e senders are forwarded via the intermediate node, it can be seen that a solution of using hop-by-hop keys can be extended to simply provide end-to-end keys for all sender(s), as well as the hop-by-hop-key(s) used by the intermediate node 1 itself.

Figure 10:
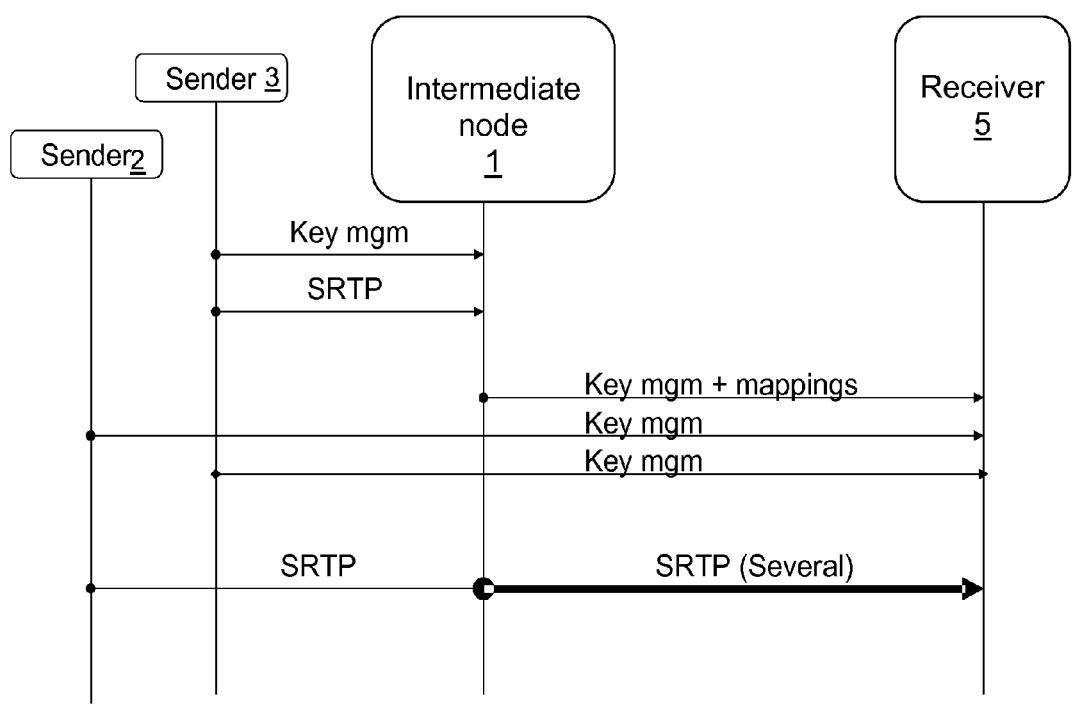
FIG. 10 is a signalling diagram showing resending of media in a multiplexed media stream according to an embodiment of the invention.

Mapping information between Context Identifiers C, SSRCs and contexts (as well as other information such as codec types) is typically sent from the intermediate node 1 to the receiver 5 before any SRTP/SRTCP is sent. In one embodiment this can be done by, for instance, including the information in SDP carried in the SIP set-up signalling. For example, a possible implementation is to add an "a-line" to the SDP, listing the context identifiers below the line providing the key management information for the specific media. If necessary, updated or new mappings can be sent during an ongoing session. The mapping information may also be sent in-band e.g. in a header extension, CSRC field, or via RTCP. A signalling diagram showing an intermediate node resending two streams is shown in FIG. 10. In this example, one of the streams is deferred and one is forwarded instantly.

Figure 11:
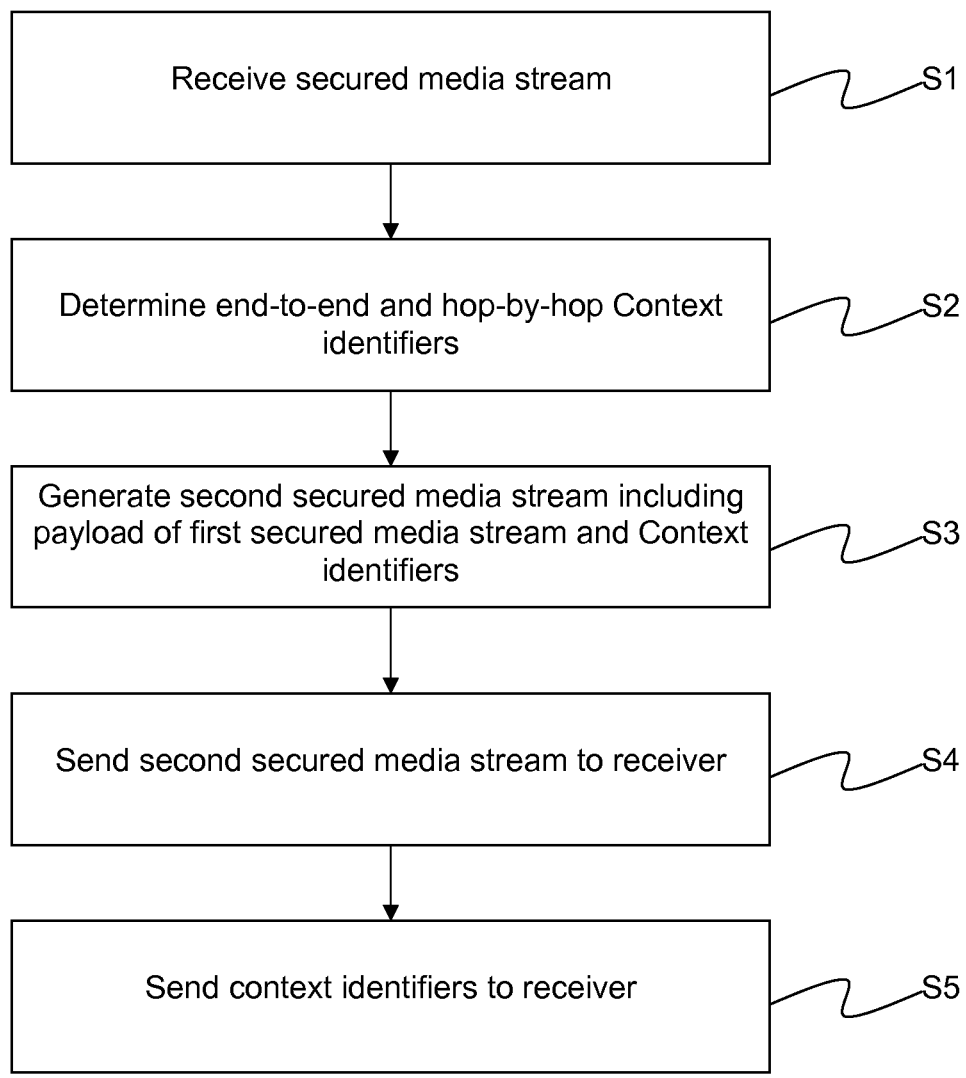
FIG. 11 is a flow diagram illustrating the steps of an embodiment of the invention.

The steps of an embodiment of the invention are illustrated in FIG. 11. The following numbering corresponds to the numbering of FIG. 11.

S1. The intermediate node 1 receives a secured media stream from a sender. In some embodiments, the intermediate node may receive a plurality of secured media streams from one or more senders.

S2. The intermediate node determines end-to-end and hop-by-hop Context identifiers (based on eSSRC and/or C-values), the Context identifiers identifying the secured media stream.

S3. The intermediate node generates a second secured media stream which, in some embodiments, is a multiplexed media stream including a plurality of secured media streams. The second secured media stream includes the payload of at least the first secured media stream and the Context identifiers to identify each secured media stream.

S4. The second secured media stream is sent to the receiving node 5.

S5. The context identifiers are sent to the receiving node, to allow the receiving node to recover each secured media stream.

Figure 12:
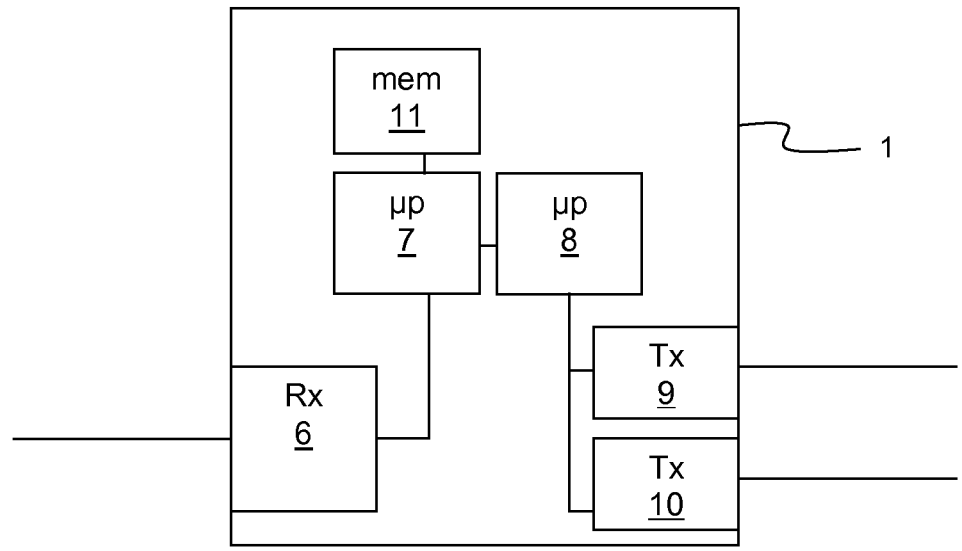
FIG. 12 illustrates schematically in a block diagram an intermediate node according to an embodiment of the invention.

Turning now to FIG. 12, there is illustrated schematically an intermediate node 1. The intermediate node 1 has a receiver 6 for receiving at least one secured media stream via SRTP session(s). A first context determining function 7 is provided to determine an end-to-end context identifier and a hop-by-hop context identifier for each secure media stream. A second processor 8, which may be a part of the first processor or a separate processor, is arranged to generate a second media stream, which may include a multiplexed plurality of media streams, using the context identifiers to identify those portions of the second media stream relating to each secured media stream. A first transmitting function 9 is provided for sending the second secured media stream using an SRTP session to the receiver node 5, and a second transmitting function 10 is provided for sending the end-to-end context identifier and the hop-by-hop context identifier to the receiver node 5. This allows the receiving node 5 to retrieve the first secure media stream, if necessary by demultiplexing the multiplexed protected media stream. The intermediate node 1 is also provided with a computer program product in the form of a memory 11 used to store a computer program that has instructions usable by the intermediate node 1 to perform the functions described above.

Figure 13:
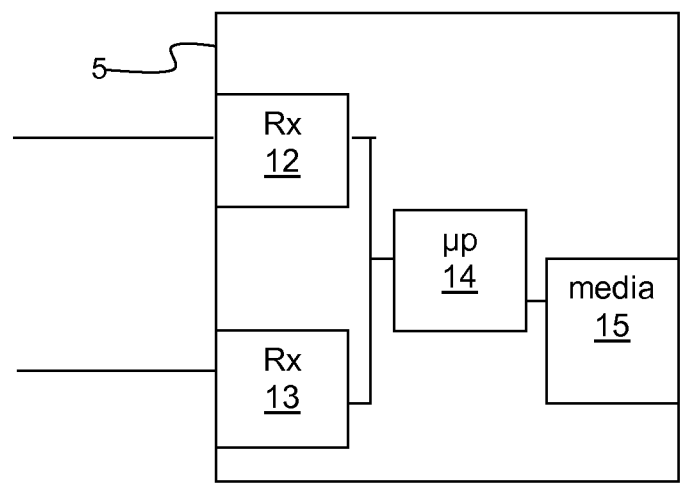
FIG. 13 illustrates schematically in a block diagram a receiving node according to an embodiment of the invention.

FIG. 13 illustrates a receiving node 5, provided with a first receiver 12 for receiving the context identifiers. A second receiver 13 is provided for receiving the secured multiplexed protected media stream using an SRTP session, and a processor 14 is provided for using the context identifiers to demultiplex the received protected media stream. A further media handling function 15 is provided for decrypting and otherwise handling the demultiplexed protected media streams.

The invention describes two different security protection contexts; the e2e context and the hop-by-hop context. They may be implemented jointly at the receiver as an multiplexed SRTP context. Multiplexing is achieved by a new Context Identifier. This identifier is based on the SSRC field, a new identifier C or a combination thereof, and is used to identify the current context. The Context Identifier C may be signalled in a header, a header extension, in an expanded MKI, or any other designated field of the RTP packet.

As discussed above, it is noted that normal SRTP context identifiers are partially implicit/out-of-band in terms of IP address and port. For the sake of clarity, the above description has focused on the handling of the in-band e2e context identifiers carried as C values, or SSRCs, etc. It is also desirable to point out that the e2e context identifiers may have implicit/out-of-band parts such as: sender identity, content identity (e.g. the "title" of a movie or song), etc, the handling of which are outside the scope of the invention.

It will be appreciated by the person of skill in the art that various modifications may be made to the above-described embodiments without departing from the scope of the invention.

The invention claimed is:

1. A method of sending a first secured media stream having a payload via an intermediate node, the method comprising:
   at the intermediate node, receiving from a sender the first secured media stream;
   determining for the first secured media stream an end-to-end cryptographic context identifier and a hop-by-hop cryptographic context identifier, the hop-by-hop cryptographic context identifier identifying a first cryptographic context of transmission of the first secured media stream by the intermediate node and the end-to-end cryptographic context identifier identifying a second cryptographic context of transmission of the first secured media stream by the sender;
   generating a second secured media stream, the second secured media stream including at least the payload of the first secured media stream and the end-to-end and hop-by-hop cryptographic context identifiers to identify the first secured media stream wherein the payload of the first secoured media stream is protected in the second secured media stream using the hop by hop cryptographic context identifier;
   sending the second secured media stream to a receiving node; and
   sending the end-to-end and hop-by-hop cryptographic context identifiers to the receiving node, the end-to-end and hop-by-hop cryptographic context identifiers being configured to enable the receiving node to recover the first secured media stream.

2. The method according to claim 1, further comprising:
   at the intermediate node, receiving from the sender at least one further secured media stream;
   determining for the further secured media stream a further end-to-end cryptographic context identifier and a further hop-by-hop cryptographic context identifier, the further hop-by-hop cryptographic context identifier identifying a third cryptographic context of transmission of the further secured media stream by the intermediate node and the further end-to-end cryptographic context identifier identifying a fourth cryptographic context of transmission of the further secured media stream by the sender;
   multiplexing at least the payloads of the first secured media stream and the further secured media stream using the cryptographic context identifiers to identify those portions of the secured multiplexed media stream relating to the first and further secured media stream respectively;
   sending the secured multiplexed media stream to the receiving node; and
   sending the further end-to-end cryptographic context identifiers and the further hop-by-hop cryptographic context identifiers to the receiving node, the further end-to-end and hop-by-hop cryptographic context identifiers being usable along with the end-to-end and hop-by-hop cryptographic context identifiers by the receiving node to demultiplex the secured multiplexed media stream.

3. The method according to claim 2, the method further comprising, at the receiving node:
   receiving the cryptographic context identifiers and the further cryptographic context identifiers;

receiving the secured multiplexed media stream;
using the cryptographic context identifiers and further cryptographic context identifiers to demultiplex the secured multiplexed media stream.

4. The method according to claim 1, wherein the end-to-end cryptographic context identifier is derived from a synchronization source used by the sender, and the hop-by-hop cryptographic context identifier is derived from a synchronization source used by the intermediate node.

5. The method according to any claim 1, further comprising sending at least one of the cryptographic context identifiers in one of a Real-time Transport Protocol synchronization source, a Real-time Transport Protocol header extension and a Contributing Source identifier in a Real-time Transport Protocol header.

6. The method according to any claim 1, further comprising sending at least one of the cryptographic context identifiers in one of a Real-time Transport Control Protocol Application packet and a PRIV field, in a Secure Real-time Transport Protocol stream.

7. The method according to claim 1, further comprising signalling at least one of the cryptographic context identifiers to the receiving node in a Secure Real-time Transport Protocol (SRTP) Master Key Identifier tag.

8. The method according to claim 1, further comprising sending the end-to-end cryptographic context identifier in a designated field of a packet.

9. The method according to claim 1 further comprising, at the receiving node,
receiving the cryptographic context identifiers;
receiving the secured media stream;
using the cryptographic context identifiers to recover the secured media stream.

10. The method of claim 1, wherein the end-to-end cryptographic context identifier identifies a synchronization source, a destination network address and a destination transport port number of the first secured media stream on an end-to-end basis and the hop-by-hop cryptographic context identifier identifies a synchronization source, a destination network address and a destination transport port number of the first secured media stream on a hop-by-hop basis.

11. An intermediate node for use in a communication network, the intermediate node comprising:
a receiver for receiving from a sender a first secured media stream;
a first context determining function for determining for the first secured media stream an end-to-end cryptographic context identifier and a hop-by-hop cryptographic context identifier, the hop-by-hop cryptographic context identifier identifying a first cryptographic context of transmission of the first secured media stream by the intermediate node and the end-to-end cryptographic context identifier identifying a second cryptographic context of transmission of the first secured media stream by the sender wherein a payload of the first secured media stream protected in the second secured media stream using the hop by hop cryptographic context identifier;
a processing function for generating a second secured media stream, the second secured media stream including at least the payload of the first secured media stream and the end-to-end and hop-by-hop cryptographic context identifiers to identify the first secured media stream;
a first transmitting function for transmitting the second secured media stream to a receiving node; and
a second transmitting function for transmitting the end-to-end and hop-by-hop cryptographic context identifiers to the receiving node, the end-to-end and hop-by-hop cryptographic context identifiers being configured to enable the receiving node to recover the secured media stream.

12. The intermediate node according to claim 11, further comprising:
a further receiving function for receiving at least one further secured media stream;
a further determining function for determining for the further secured media stream a further end-to-end cryptographic context identifier and a further hop-by-hop cryptographic context identifier, the further hop-by-hop cryptographic context identifier identifying a third cryptographic context of transmission of the further secured media stream by the intermediate node and the further end-to-end cryptographic context identifier identifying a fourth cryptographic context of transmission of the further secured media stream by the sender;
a multiplexing function for multiplexing at least the payload of the first secured media stream and the further secured media stream using the end-to-end and hop-by-hop cryptographic context identifiers and the further end-to-end and further hop-by-hop cryptographic context identifiers to identify those portions of the secured multiplexed media stream relating to each secured media stream;
wherein the first transmitting function is arranged to send the secured multiplexed media stream to the receiving node; and
the second transmitting function is arranged to send the end-to-end and hop-by-hop cryptographic context identifiers and the further end-to-end and further hop-by-hop cryptographic context identifiers to the receiving node, the further end-to-end and hop-by-hop cryptographic context identifiers being configured, along with the end-to-end and hop-by-hop cryptographic context identifiers to enable the receiving node to demultiplex the secured multiplexed media stream.

13. The intermediate node of claim 11, wherein the end-to-end cryptographic context identifier identifies a synchronization source, a destination network address and a destination transport port number of the first secured media stream on an end-to-end basis and the hop-by-hop cryptographic context identifier identifies a synchronization source, a destination network address and a destination transport port number of the first secured media stream on a hop-by-hop basis.

14. A receiving node for receiving a multiplexed secured media stream derived from a plurality of secured media streams, the receiving node comprising:
a first receiver for receiving an end-to-end cryptographic context identifier and a hop-by-hop cryptographic context identifier, the end-to-end cryptographic context identifier identifying a first cryptographic context of transmission of a first secured media stream of the plurality of secured media streams in the multiplexed secured media stream by a sender, the hop-by-hop cryptographic context identifier identifying a second cryptographic context of transmission of the first secured media stream by an intermediate node between the sender and the receiving node, the end-to-end and hop-by-hop cryptographic context identifiers used for multiplexing the plurality of secured media streams to identify those portions of the secured multiplexed media stream relating to each media stream wherein a payload of the first secured media stream is protected in the secured multiplexed media stream using the hop by hop cryptographic context identifier;

a second receiver for receiving the secured multiplexed media stream; and a processor for using the end-to-end and hop-by-hop cryptographic context identifiers to demultiplex the secured multiplexed media stream.

15. The receiving node of claim 14, wherein the end-to-end cryptographic context identifier identifies a synchronization source, a destination network address and a destination transport port number of the first secured media stream on an end-to-end basis and the hop-by-hop cryptographic context identifier identifies a synchronization source, a destination network address and a destination transport port number of the first secured media stream on a hop-by-hop basis.

16. A computer program product for sending a first secured media stream having a payload via an intermediate node, the computer program product comprising a non-transitory computer readable storage medium having computer readable program code embodied in the medium, the computer readable program code comprising:

computer readable program code configured to receive from a sender the first secured media stream at the intermediate node;

computer readable program code configured to determine for the first secured media stream an end-to-end cryptographic context identifier and a hop-by-hop cryptographic context identifier, the hop-by-hop cryptographic context identifier identifying a first cryptographic context of transmission of the first secured media stream by the intermediate node and the end-to-end cryptographic context identifier identifying a second cryptographic context of transmission of the first secured media stream by the sender;

computer readable program code configured to generate a second secured media stream, the second secured media stream including at least the payload of the first secured media stream and the end-to-end and hop-by-hop cryptographic context identifiers to identify the first secured media stream wherein the payload of the first secured media stream is protected in the second secured media stream using the hop by hop cryptographic context identifier;

computer readable program code configured to send the second secured media stream to a receiving node; and computer readable program code configured to send the end-to-end and hop-by-hop cryptographic context identifiers to the receiving node, the end-to-end and hop-by-hop cryptographic context identifiers being configured to enable the receiving node to recover the first secured media stream.

17. The computer program product of claim 16, wherein the end-to-end cryptographic context identifier identifies a synchronization source, a destination network address and a destination transport port number of the first secured media stream on an end-to-end basis and the hop-by-hop cryptographic context identifier identifies a synchronization source, a destination network address and a destination transport port number of the first secured media stream on a hop-by-hop basis.

\* \* \* \* \*

UNITED STATES PATENT AND TRADEMARK OFFICE
CERTIFICATE OF CORRECTION

PATENT NO.         : 8,966,105 B2
APPLICATION NO.    : 12/999178
DATED              : February 24, 2015
INVENTOR(S)        : Blom et al.

It is certified that error appears in the above-identified patent and that said Letters Patent is hereby corrected as shown below:

On the title page item 75, under "Inventors", in Column 1, Line 2, delete "Sundyberg (SE);" and insert -- Sundbyberg (SE); --, therefor.

On the title page item 75, under "Inventors", in Column 1, Line 3, delete "Mats Nåslund," and insert -- Mats Näslund, --, therefor.

On the title page item 73, under "Assignee", in Column 1, Line 1, delete "Telefonaktiebolget" and insert -- Telefonaktiebolaget --, therefor.

In the specification

In Column 1, Line 27, delete "such is" and insert -- such as --, therefor.

In Column 7, Line 26, delete "Hop-by-hop context $id_{j=<iSSRC_j>}$" and insert -- Hop-by-hop context id_j = < iSSRC_j > --, therefor.

In the claims

In Column 12, Line 28, in Claim 1, delete "secoured" and insert -- secured --, therefor.

In Column 13, Line 10, in Claim 5, delete "any claim 1," and insert -- claim 1, --, therefor.

In Column 13, Line 16, in Claim 6, delete "any claim 1," and insert -- claim 1, --, therefor.

In Column 13, Line 19, in Claim 6, delete "PRIV field," and insert -- PRIV field --, therefor.

In Column 13, Line 56, in Claim 11, delete "stream" and insert -- stream is --, therefor.

Signed and Sealed this
First Day of March, 2016

Michelle K. Lee
*Director of the United States Patent and Trademark Office*